United States Patent
Schumann et al.

(10) Patent No.: US 10,487,927 B2
(45) Date of Patent: Nov. 26, 2019

(54) ACTUATOR WITH PLANETARY SCREW DRIVE (PSD)

(71) Applicant: Schaeffler Technologies AG & Co. KG, Herzogenaurach (DE)

(72) Inventors: Lars Schumann, Buehl (DE); Lazlo Man, Ottersweier-Unzhurst (DE); Peter Greb, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 114 days.

(21) Appl. No.: 15/101,667

(22) PCT Filed: Nov. 28, 2014

(86) PCT No.: PCT/DE2014/200667
§ 371 (c)(1),
(2) Date: Jun. 3, 2016

(87) PCT Pub. No.: WO2015/081951
PCT Pub. Date: Jun. 11, 2015

(65) Prior Publication Data
US 2016/0305519 A1    Oct. 20, 2016

(30) Foreign Application Priority Data

Dec. 6, 2013   (DE) ......................... 10 2013 225 120

(51) Int. Cl.
*F16H 25/22*       (2006.01)
*H02K 7/06*        (2006.01)
(Continued)

(52) U.S. Cl.
CPC ......... *F16H 25/2266* (2013.01); *F16D 23/12* (2013.01); *F16H 25/2252* (2013.01);
(Continued)

(58) Field of Classification Search
CPC .... F16H 1/28; F16H 25/2015; F16H 25/2252; F16H 25/2472; F16H 2025/2075; F16D 23/12; F16D 2023/123
See application file for complete search history.

(56) References Cited

U.S. PATENT DOCUMENTS

| | | | | |
|---|---|---|---|---|
| 4,926,708 A | * | 5/1990 | Dietrich | F16H 25/2252 74/424.75 |
| 6,218,829 B1 | * | 4/2001 | Wittenstein | G01B 7/003 324/207.21 |

(Continued)

FOREIGN PATENT DOCUMENTS

| | | |
|---|---|---|
| CN | 1717553 | 1/2006 |
| DE | 277308 | 3/1990 |

(Continued)

*Primary Examiner* — Zakaria Elahmadi
(74) *Attorney, Agent, or Firm* — Davidson, Davidson & Kappel, LLC

(57) ABSTRACT

An actuator with a planetary screw drive (PSD), in particular to operate a clutch of a vehicle, wherein a centric spindle having a pitch is connected non-rotatingly to a rotor of a drive and is drivable by the drive around an axis of rotation, and a plurality of planetary rollers are engaged with the spindle and mesh with a ring gear encircling the planetary rollers which has grooves in the circumferential direction, wherein both ends of the planetary rollers are positioned in a planetary roller carrier. The planetary roller carriers are supported non-rotatingly on both ends in such a way that a fixed assignment of the pitch of the spindle to an axial travel of a component that is movable axially by the PSD, which is operatively connected to an axially actuatable piston, is realized.

14 Claims, 3 Drawing Sheets

(51) Int. Cl.
*F16D 23/12* (2006.01)
*F16H 25/20* (2006.01)
*F16D 28/00* (2006.01)

(52) U.S. Cl.
CPC ............... *H02K 7/06* (2013.01); *F16D 28/00* (2013.01); *F16D 2023/123* (2013.01); *F16H 2025/2075* (2013.01); *F16H 2025/2087* (2013.01)

(56) References Cited

U.S. PATENT DOCUMENTS

| | | | |
|---|---|---|---|
| 8,490,391 B2 | 7/2013 | Franz et al. | |
| 8,888,644 B2* | 11/2014 | Rink | F16H 25/2252 475/195 |
| 9,051,974 B2 | 6/2015 | Gramann et al. | |
| 2005/0205377 A1* | 9/2005 | Borgerson | F16D 28/00 192/48.3 |
| 2006/0266146 A1* | 11/2006 | Waide | F16H 25/2252 74/424.92 |
| 2009/0064774 A1* | 3/2009 | Panzer | F16D 21/06 73/115.04 |
| 2011/0247904 A1* | 10/2011 | Yamasaki | F16D 65/18 188/72.1 |
| 2012/0160043 A1* | 6/2012 | Drumm | F16H 25/20 74/89.23 |
| 2012/0217117 A1* | 8/2012 | Gramann | F16D 29/005 192/83 |
| 2012/0241281 A1* | 9/2012 | Franz | F16D 29/005 192/84.6 |
| 2012/0292140 A1* | 11/2012 | Reich | F16D 65/56 188/72.3 |
| 2013/0056660 A1* | 3/2013 | Roby | F01P 7/14 251/129.11 |
| 2013/0082081 A1* | 4/2013 | Bertsch | B25C 1/06 227/2 |
| 2013/0143712 A1* | 6/2013 | Osterlanger | B23P 15/14 475/333 |
| 2013/0337959 A1* | 12/2013 | Suzuki | H02K 5/1732 475/149 |
| 2014/0105768 A1 | 4/2014 | Franz et al. | |
| 2015/0013483 A1* | 1/2015 | Schwarzbach | B29C 45/76 74/89.14 |
| 2015/0135868 A1* | 5/2015 | Nikolaev | H02K 7/06 74/89.34 |
| 2015/0263587 A1* | 9/2015 | Fedosovsky | F16H 57/0497 310/68 B |
| 2016/0230814 A1* | 8/2016 | Schumann | F16D 13/08 |
| 2016/0290455 A1* | 10/2016 | Schumann | F16D 23/12 |

FOREIGN PATENT DOCUMENTS

| | | |
|---|---|---|
| DE | 102010047800 | 5/2011 |
| DE | 102010047801 | 5/2011 |
| DE | 102010011820 | 9/2011 |
| DE | 102011014932 | 10/2011 |
| DE | 102011088995 | 6/2013 |
| EP | 0168942 | 1/1986 |
| EP | 1617103 | 1/2006 |
| JP | H10196756 A | 7/1998 |
| JP | 2007285480 A | 11/2007 |
| JP | 2009103291 | 5/2009 |
| WO | WO2011113724 | 9/2011 |
| WO | WO2011127888 | 10/2011 |

* cited by examiner

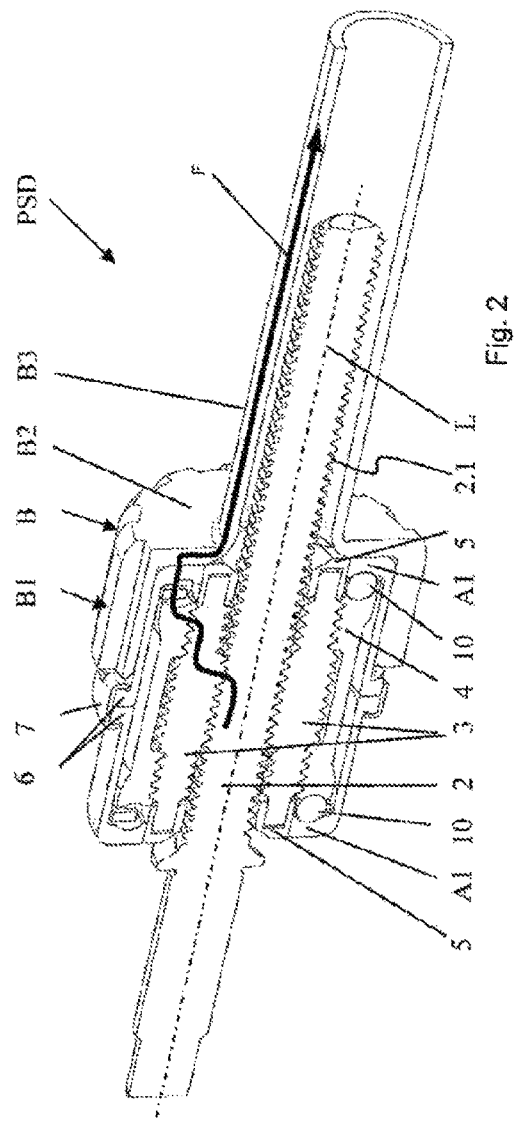
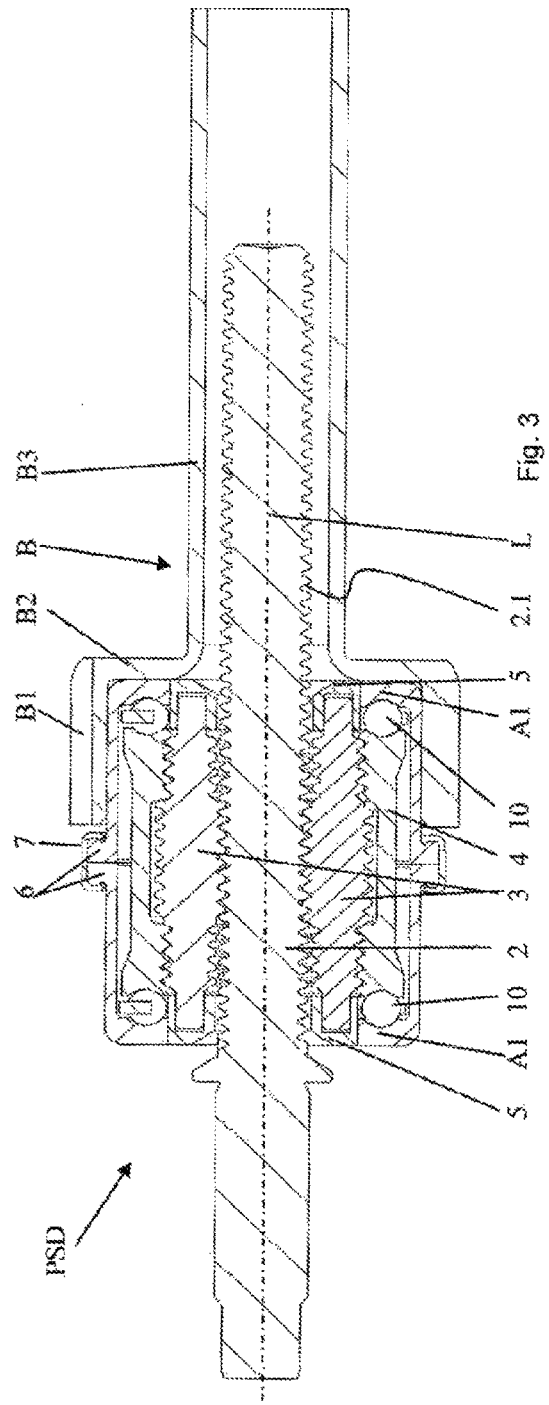
Fig. 2
Fig. 3

ACTUATOR WITH PLANETARY SCREW DRIVE (PSD)

The invention relates to an actuator with a planetary screw drive (PSD).

BACKGROUND

Planetary screw drives (PSDs) (also referred to as planetary roller screw drives) have been the state of the art for many years, and are described, for example, in DD 0277308 A5. A planetary screw drive is known, for example, from published patent DE 10 2010 047 800 A1, which is contained in a hydrostatic actuator in the form of a hydrostatic clutch actuator in order to convert a rotary motion produced by means of an electric motor to an axial motion. A planetary screw drive having a screw spindle and having a nut situated on the screw spindle and having a plurality of planet gears distributed around the circumference, positioned between the screw spindle and the nut, which are arranged so that they can roll on the inside circumference of the nut as well as on the outside circumference of the screw spindle, is known from printed publication DE 10 2010 011 820 A1. In this solution, a pre-stressing device is provided for the planet gears, wherein the nut has two parts that are movable axially relative to each other, and wherein the pre-stressing device has a spring element that is spring loaded against the one nut part. The nut assumes two functions: on the one hand it is part of the transmission, and on the other hand it is part of the pre-stressing device.

It is also known (see DE 10 2011 088 995 A1) to perform an absolute measurement to register the slip of a PSD having a screw spindle and having a spindle nut situated on the screw spindle and having a plurality of planet gears distributed around the circumference, where a sensor element that is positioned axially immovably relative to the spindle nut registers an axial displacement of the screw spindle and the spindle nut relative to each other; the spindle nut being supported on a housing that has the sensor element, so that it can rotate around the spindle axis.

A yet unpublished application describes a disengaging system for a clutch of a motor vehicle, wherein while using a drive a piston that is actuated is supported so that it is movable axially in a housing by means of a PSD, while the position of the piston is ascertainable using sensor technology.

The known systems are of relatively complex design, since a pre-tensioning must be realized and a change in the pitch of the PSD system due to slip makes a distance sensor necessary for exact positioning.

For the boundary condition that the pitch in the ring gear nuts and on the planetary rollers 3 is zero, the following boundary cases result:

Boundary case 1: when there is sticking between spindle and planetary rollers, no advance/axial movement occurs relative to the spindle when the latter rotates, so that 100% slip must be registered between planetary rollers and ring gear nut and the efficiency is zero.

Boundary case 2: when there is sticking between planetary rollers and ring gear nut, a spindle pitch of 1:1 with 100% slip between planetary rollers and spindle is realized, so that the efficiency is very low.

SUMMARY OF THE INVENTION

It is an object of the present invention to provide an actuator with a planetary screw drive which avoids a change in pitch due to slip, ensures good efficiency and is simple to construct.

The present invention provides that the actuator has a planetary screw drive (PSD) and is employed in particular to actuate a clutch of a vehicle, where a centric spindle having a pitch is connected non-rotatingly to a rotor of a drive and is drivable by the drive around an axis of rotation, and a plurality of planetary rollers are engaged with the spindle and mesh with a ring gear encircling the planetary rollers which has grooves in the circumferential direction, where both ends of the planetary rollers are positioned in a planetary roller carrier and according to the invention the planetary roller carriers are supported non-rotatingly on both ends, in such a way that a fixed assignment of the pitch of the spindle to an axial travel of a component that is movable axially by means of the PSD, which is operatively connected to an axially actuatable piston, can be realized.

This makes it possible for the first time to determine the axial travel by means of the pitch of the spindle, without using expensive sensor technology.

By using for the first time a PSD having a non-rotatingly supported planetary roller carrier, and in connection therewith a slip-independent system pitch, it is possible in an actuator to dispense with a distance sensor (in the existing art the latter is necessary due to slip) and with the associated components in the electronics, because the slip does not affect the axial motion of the axially movable components of the PSD.

The solution according to the invention is advantageously combined with the possibility of referencing, whereby an axial reference position/zero position of an axially movable element of the actuator is determinable.

The two planet carriers are preferably supported non-rotatingly in a first sleeve, which encircles the ring gear and points radially inward at both ends, and this first sleeve is received, directly or by means of a second sleeve or some other intermediate element, in a housing fastened firmly to the frame, so that it is non-rotating and axially movable. The ring gear transfers the axial forces of the planetary rollers to the first sleeve, which strikes the second sleeve, which is secured against rotation relative to the first sleeve; connected to the second sleeve is a piston, which operates a clutch, for example.

The housing is fastened non-rotatingly to a motor block which receives the drive (preferably an electric motor), and is pre-stressed against at least one spring or a spring assembly, the first sleeve being movable contrary to a disengagement motion of the piston against the spring assembly, until the latter is tensioned to the point of blockage. This makes it possible to determine the zero position or an axial reference point of the PSD, and thus of the piston, by means of the characteristic curve of the spring assembly.

The first sleeve, which is connected non-rotatingly and axially immovably to the planetary roller carrier, transfers the axial forces and the motion in the form of axial travel either directly or through the second sleeve (or an equivalent intermediate element) to the piston, which causes the latter to carry out a disengagement motion. In the referencing direction, the first sleeve presses on the spring/spring assembly to determine the axial reference point/zero point.

After the reference point/zero point is known, it becomes possible by means of the pitch of the spindle to determine the axial position of the first sleeve, and thus of the other axially movable components that are connected to it, since they, together with the planetary roller carriers, are fixed non-rotatingly relative to the housing.

Through the anti-rotation protection of the planetary roller carriers, in combination with the spring assembly which enables an axial reference point, the determination of position is realizable by means of a rotational angle sensor of the electric motor or of the spindle. Furthermore, the determination of axial position is possible by means of the motor characteristic curve or the characteristic of the motor current, since these characteristics correspond to the characteristic of the spring/spring assembly (force-deformation pattern).

Furthermore, the position of the clutch is determinable through its characteristic, by means of a plausibility check.

The spindle has a pitch≠0, and is advantageously combined only with an angle transmitter for an angle/position sensor, which is connected non-rotatingly to the rotor of a driving electric motor.

The first sleeve is preferably designed in two parts, and is joined together axially and non-rotatingly by means of a clamp that encircles them.

The second sleeve has longitudinal toothing on its outside diameter, which meshes with longitudinal toothing on the inside contour of the housing in such a way that the second sleeve is received non-rotatingly and axially movably in the housing. Furthermore, the second sleeve is connected to the piston, so that an axial movement is transferred to the piston and the clutch is actuated thereby.

By using the solution according to the invention, a change of pitch due to slip is avoided (slip is not avoided), while good efficiency is maintained. This enables the use of a distance sensor to be omitted, and the electronics in actuators that have to move to a specific position due to increased functional safety demands can be simplified. For positioning, only an integrated rotary sensor is used whose signal is compared to a characteristic only by means of plausible referencing.

BRIEF DESCRIPTION OF THE DRAWINGS

The invention will be explained in greater detail below on the basis of an exemplary embodiment with corresponding drawings.

The figures show the following:

FIG. 2 the three-dimensional depiction of a longitudinal section with the flow of force F in the disengagement direction of the piston sketched in, and FIG. 3 the longitudinal section of the PSD with first and second sleeves, FIG. 4 a three-dimensional depiction of the PSD according to FIGS. 2 and 3, but without a second sleeve, FIG. 5 a three-dimensional detail view of the housing.

DETAILED DESCRIPTION

Figure 1:
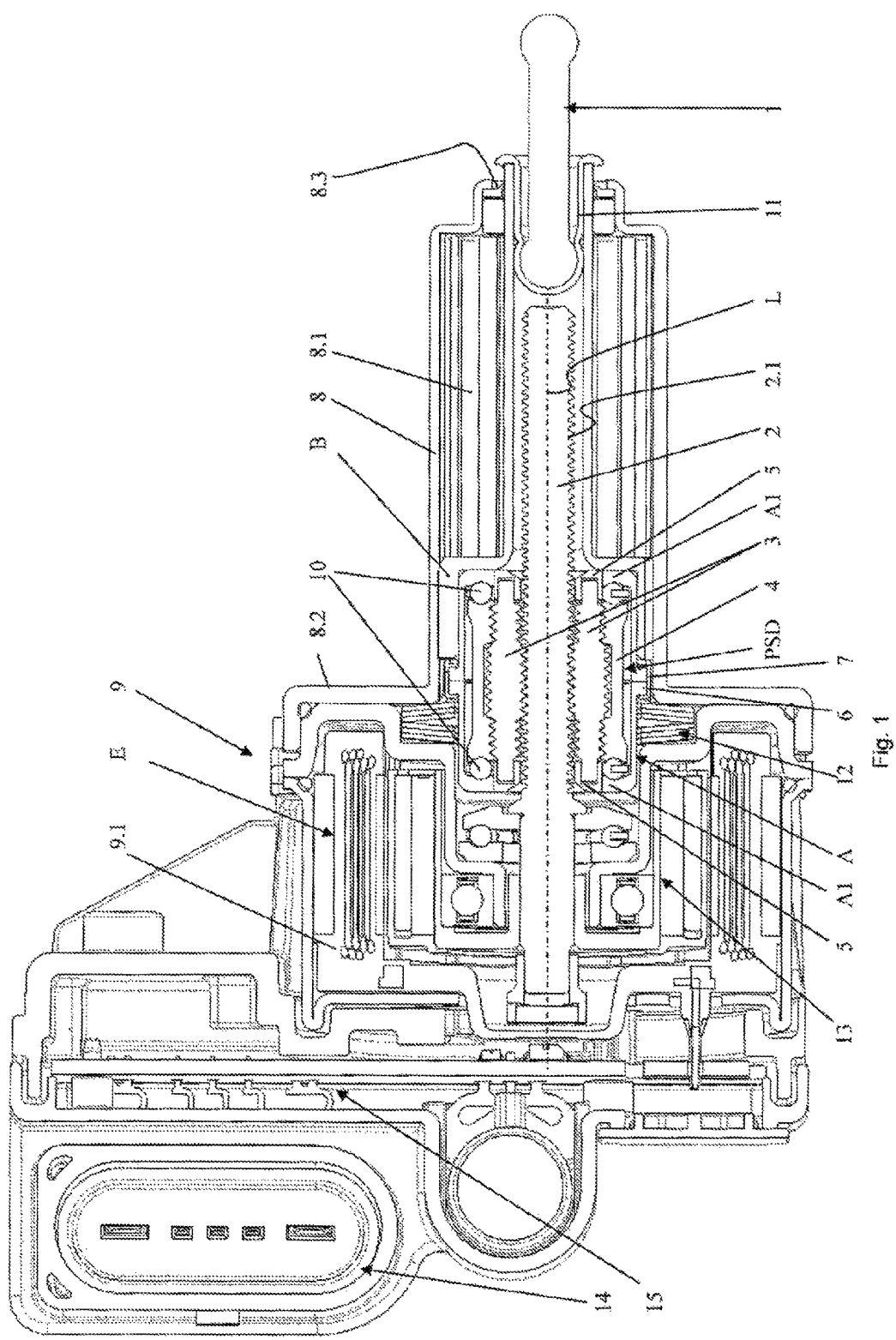
FIG. 1 the longitudinal section of the actuator.

FIG. 1 shows an actuator in longitudinal section, which has a planetary screw drive (PSD) with which the rotary motion produced by an electric motor E is converted to an axial stroke motion whereby a piston 1 can advance and a clutch (not shown) can be actuated thereby. The transmission in the form of a planetary screw drive PSD (also see FIGS. 2 and 3) has a spindle 2 having outside threading 2.1 with a pitch, which is connected non-rotatingly to an unspecified rotor of the drive (in this case electric motor E) and is drivable by the drive around an axis of rotation L. The spindle 2 engages a plurality of planetary rollers 3, which mesh with a ring gear 4 having grooves in the circumferential direction, which encircles the planetary rollers 3. Preferably three or a multiple of three planetary rollers 3 are positioned around the spindle 2 in the circumferential direction. The planetary rollers 3 are held rotatingly at each of their two ends in a planetary roller carrier 5, the two planetary roller carriers 5 being supported non-rotatingly.

To that end, each planetary roller carrier 5 is received in a region A1 of the first sleeve A whose end points radially inward, which is subdivided into two halves which have a collar 6 directed radially outward and are firmly joined together axially by means of a clamp 7 (preferably made of sheet metal). The first sleeve A sits non-rotating and axially fixed in a second sleeve B, which in turn is received non-rotatingly but axially movably in a housing 8 and is sealed relative to the latter. The second sleeve B has on its outside diameter external toothing B1 (see FIG. 2), which corresponds to internal toothing 8.1 (see also FIG. 5) of the housing 8. The housing 8 is fastened firmly to the frame of the motor housing 9 of the electric motor E through a flange area 8.2 which faces radially outward.

The second sleeve B, the first sleeve A and the planetary roller carrier 5 are thus arranged non-rotatingly by means of the housing 8.

The ring gear 4 transfers the axial forces from the planetary rollers 3 into the sleeve A through two axial bearings 10 of the PSD which ensure internal transmission of the PSD force, by means of positive locking (non-indicated circumferential grooves).

The first sleeve A transmits the axial forces and the axial travel through the second sleeve B to the element which is to be actuated (in this case the piston 1), which, according to FIG. 1, is fastened by means of a receiving part 11 to the end of the second sleeve B which points outward through a centric opening 8.3 of the housing 8.

It can be seen from FIG. 1 that the housing 8 with its radially outward-facing flange region 8.2 here pre-stresses a spring assembly 12 in the form of a diaphragm spring assembly 12 against the motor housing 9. The first sleeve A presses with the radially outward-facing collar 6, which is encircled by the clamp 7, on the spring assembly 12, which is pre-stressed by the housing 8, in order to ensure plausible referencing.

The spindle 2 is provided with a pitch≠0 and has an angle transmitter (not shown) for an angle and/or position sensor, which is/are connected non-rotatingly to the rotor of the driving electric motor E.

In this case, a bearing unit 13 is preferably implemented as a 4-point bearing, here as a combination axial and radial bearing, in order to absorb the axial forces and the rotation of the spindle 2 relative to the housing 8.

The motor housing 9 has the stator 9.1, the requisite electronics (not indicated) and interfaces to the outside (plug 14, capacitor 15, etc.). Furthermore, firmly coupled with the frame of the motor housing 9 is the housing 8, in which the rotational bracing of the planetary roller carrier 5 is realized indirectly by means of the first sleeve A and the second sleeve B through the internal toothing 8.1 in the form of the longitudinal grooves.

Through the use of a PSD with non-rotatingly supported planetary roller carriers 5, and connected therewith a slip-independent system pitch in combination with the possibility of referencing, it is possible in the actuator according to the invention to dispense with a distance sensor (according to the existing art the latter is necessary due to slip) and the associated components in the electronics.

For the purposes of clarification, FIGS. 2 and 3 show again the gear unit of the actuator in the form of the planetary screw drive PSD, the essentials of which were already described in FIG. 1.

In FIG. 2, the force progression F through the spindle 2 to the second sleeve B, whereby the piston 1 (not shown) is actuated, is depicted by the arrow, and from FIGS. 2 and 3 the external toothing B1, taking the form of longitudinal grooves in the second sleeve B, is evident. The area of the second sleeve B that has the external toothing B1 extends over only half of the first sleeve A, and after the external toothing B1 it has a radially inward-directed shoulder B2 which the first sleeve A strikes axially. Radially adjoining the shoulder B2 is a tubular region B3, which surrounds the spindle 2 and to which the piston (see FIG. 1) is attached.

Figure 4:
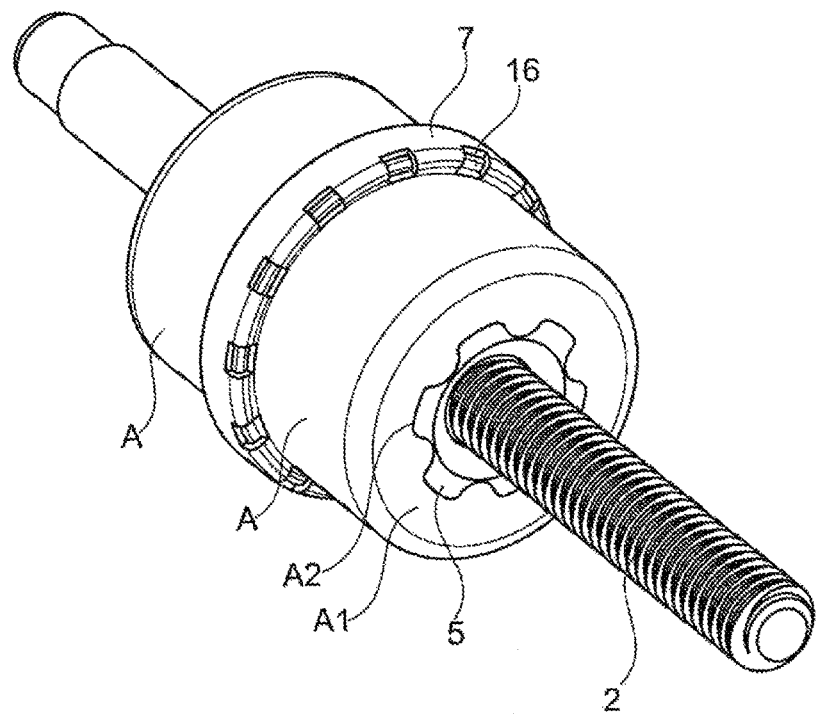

FIG. 4 shows a three-dimensional depiction of the PSD according to FIGS. 2 and 3, but only with sleeve A and without second sleeve B. On the radially inward-facing region A1, the first sleeve A has recesses A2 which are engaged positively by the planetary roller carriers 5, so that the latter are non-rotating relative to the first sleeve A. The two halves of the first sleeve A and the clamp 7 are axially fixed and secured to each other non-rotatingly by means of interlocking form elements 16.

Figure 5:
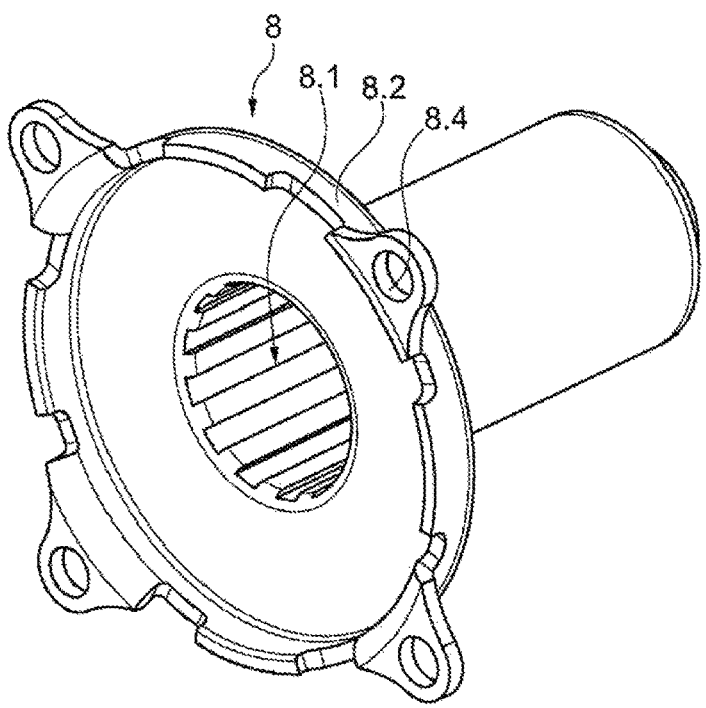

FIG. 5 shows a detailed depiction 5 of the housing 8, which has internal toothing 8.1 in the form of longitudinal toothing or longitudinal grooves and thereby receives the second sleeve B with its external toothing B1 non-rotatingly and axially movably. The housing 8 is fastened by its flange region 8.2 to the motor housing 9 (not shown here), and to that end has screw holes 8.4.

According to the present invention, the planetary roller carrier is supported non-rotatingly for the first time. The spindle 2 is connected non-rotatingly to the rotor and the ring gear 4 transfers the axial forces of the planetary rollers 3 to a first sleeve A, which is designed in two pieces, preferably as a sheet metal part. The first sleeve A strikes a second sleeve B, which makes the lifting motion of the piston 1 possible. Sleeve A is secured against rotation relative to sleeve B, and the planetary roller carriers 5 are supported non-rotatably in sleeve A. Through this anti-rotation protection in combination with the spring assembly 12, which makes an axial reference point possible, a measurement of position can be made in a simple manner by means of a rotational angle sensor of the electric motor E or of the spindle 2. In a preferred embodiment, a plausibility check is also made by means of the characteristic curve of the clutch in order to determine the position correctly.

It is possible to realize the avoidance of change of pitch due to slip (not avoidance of slip) while maintaining good efficiency. Furthermore, a simple possibility of referencing is made available. This enables the distance sensor to be omitted, and the electronics in actuators that have to move to a specific position due to increased functional safety demands are eliminated. For positioning, only an integrated rotary sensor is used, whose signal is compared to a characteristic only by means of plausible referencing.

REFERENCE LABELS 1 piston
2 spindle
2.1 outside threading
3 planetary rollers
4 ring gear
5 planetary roller carrier
6 flange
7 clamp
8 housing
8.1 inner toothing
8.2 flange region
8.3 opening
8.4 screw holes
9 motor housing
9.1 stator
10 axial bearing
11 receiving part
12 spring assembly
13 bearing unit
14 plug
15 electronics (capacitor)
16 form elements
A first sleeve
A1 region facing radially inward
B second sleeve
B1 outer toothing
B2 shoulder
B3 tubular region
E electric motor
F flow of force
L axis of rotation
PSD planetary screw drive

The invention claimed is:

1. An actuator with a planetary screw drive (PSD), comprising:
a centric spindle having a pitch, the centric spindle connected non-rotatingly to a rotor of a drive and drivable by the drive around an axis of rotation;
a plurality of planetary rollers engaged with the spindle and meshing with a ring gear encircling the planetary rollers, the ring gear having grooves in a circumferential direction, wherein both ends of the planetary rollers are positioned in a planetary roller carrier, the planetary roller carriers being supported non-rotatingly on both ends, a pitch of the spindle being fixed to an axial travel of a component movable axially via the PSD, the component being operatively connected to an axially actuatable piston, the piston being axially spaced from the spindle, wherein the component includes radially inward-facing regions surrounding both axial sides of the ring gear; and
axial bearings on both of the axial sides of the ring gear, each of the axial bearings being axially between one of the radially inward-facing regions and one of the axial sides of the ring gear,
wherein each of the radially inward-facing regions are engaged positively by the planetary roller carriers so the planetary roller carriers are non-rotating relative to the component.

2. The actuator as recited in claim 1 wherein the component includes a first sleeve and a second sleeve, the planetary roller carriers are supported non-rotatingly in the first sleeve, the first sleeve encircling the ring gear and facing radially inward at both ends, the first sleeve being received, directly or via the second sleeve, in a housing fastened firmly to a frame so that the first sleeve is non-rotating and axially movable.

3. The actuator as recited in claim 2 wherein the ring gear transfers axial forces of the planetary rollers to the first sleeve, the first sleeve striking the second sleeve, the second sleeve being secured against rotation relative to the first sleeve; the piston is connected to the second sleeve.

4. The actuator as recited in claim 2 wherein the housing is attached non-rotatingly to a motor block which receives the drive and is pre-stressed against at least one spring, the first sleeve movable contrary to a disengagement motion of the piston against the spring until the spring is tensioned to a point of blockage, and a zero position or an axial reference point of the PSD and thus of the piston is determinable via a characteristic curve of the spring.

5. The actuator as recited in claim 4 wherein the first sleeve, which is connected non-rotatingly and axially fixedly to the planetary roller carrier, transfers axial forces and movement in the form of axial travel to the piston through the second sleeve and presses in a referencing direction on the spring.

6. The actuator as recited in claim 4 wherein through anti-rotation protection of the planetary carriers in combination with the spring, which makes an axial reference point possible, a determination of position is realizable via a rotational angle sensor.

7. The actuator as recited in claim 1 wherein a position of a clutch is determinable through a characteristic curve via a plausibility check.

8. The actuator as recited in claim 1 wherein the spindle has a pitch≠0 and is combined with an angle transmitter for an angle or position sensor connected non-rotatingly to the rotor, the drive being a driving electric motor.

9. The actuator as recited in claim 2 wherein the first sleeve is designed in two pieces and the two pieces of the first sleeve are connected to each other via a clamp encircling the two pieces, the second sleeve being connected axially and non-rotatingly to the first sleeve and the second sleeve has on an outside diameter longitudinal toothing meshing with longitudinal toothing on an inside contour of the housing, in such a way that the second sleeve is received non-rotatingly and axially movably in the housing.

10. The actuator as recited in claim 2 wherein the second sleeve is connected non-rotatingly to the piston.

11. A vehicle comprising the actuator as recited in claim 1 and a clutch operated by the actuator.

12. An actuator with a plentary screw drive (PSD), comprising:
a centric spindle having a pitch, the centric spindle connected non-rotatingly to a rotor of a drive and drivable by the drive around an axis of rotation;
a plurality of planetary rollers engaged with the spindle and meshing with a ring gear encircling the planetary rollers, the ring gear having grooves in a circumferential direction, wherein both ends of the planetary rollers are positioned in a planetary roller carrier, the planetary roller carriers being supported non-rotatingly on both ends, a pitch of the spindle being fixed to an axial travel of a component movable axially via the PSD, the component being operatively connected to an axially actuatable piston,
wherein the component includes a first sleeve and a second sleeve, the planetary roller carriers are supported non-rotatingly in the first sleeve, the first sleeve encircling the ring gear and facing radially inward at both ends, the first sleeve being received, directly or via the second sleeve, in a housing fastened firmly to a frame so that the first sleeve is non-rotating and axially movable,
wherein the ring gear transfers axial forces of the planetary rollers to the first sleeve, the first sleeve striking the second sleeve, the second sleeve being secured against rotation relative to the first sleeve; the piston is connected to the second sleeve.

13. An actuator with a planetary screw drive (PSD), comprising:
a centric spindle having a pitch, the centric spindle connected non-rotatingly to a rotor of a drive and drivable by the drive around an axis of rotation;
a plurality of planetary rollers engaged with the spindle and meshing with a ring gear encircling the planetary rollers, the ring gear having grooves in a circumferential direction, wherein both ends of the planetary rollers are positioned in a planetary roller carrier, the planetary roller carriers being supported non-rotatingly on both ends, a pitch of the spindle being fixed to an axial travel of a component movable axially via the PSD, the component being operatively connected to an axially actuatable piston,
wherein the component includes a first sleeve and a second sleeve, the planetary roller carriers are supported non-rotatingly in the first sleeve, the first sleeve encircling the ring gear and facing radially inward at both ends, the first sleeve being received, directly or via the second sleeve, in a housing fastened firmly to a frame so that the first sleeve is non-rotating and axially movable,
wherein the first sleeve, which is connected non-rotatingly and axially fixedly to the planetary roller carrier, transfers axial forces and movement in the form of axial travel to the piston through the second sleeve and presses in a referencing direction on a spring.

14. The actuator as recited in claim 1 wherein the component extends axially from the planetary roller carriers past an axial end of the spindle to the piston.

* * * * *